(12) United States Patent
Garg et al.

(10) Patent No.: US 11,030,404 B1
(45) Date of Patent: Jun. 8, 2021

(54) SYSTEM, METHOD, AND COMPUTER PROGRAM FOR USING MACHINE LEARNING TO CALIBRATE JOB DESCRIPTION BASED ON DIVERSITY CRITERIA

(71) Applicant: Eightfold AI Inc., Mountain View, CA (US)

(72) Inventors: Ashutosh Garg, Mountain View, CA (US); Varun Kacholia, Mountain View, CA (US); Ruoyu Roy Wang, Mountain View, CA (US)

(73) Assignee: Eightfold AI Inc., Mountain View, CA (US)

( * ) Notice: Subject to any disclaimer, the term of this patent is extended or adjusted under 35 U.S.C. 154(b) by 0 days.

(21) Appl. No.: 17/033,575

(22) Filed: Sep. 25, 2020

Related U.S. Application Data

(63) Continuation of application No. PCT/US2020/012317, filed on Jan. 6, 2020.

(51) Int. Cl.
| | | |
|---|---|---|
| *G06F 40/30* | (2020.01) | |
| *G06F 40/253* | (2020.01) | |
| *G06N 20/00* | (2019.01) | |
| *G06F 40/166* | (2020.01) | |
| *G06F 40/289* | (2020.01) | |
| *G06Q 10/10* | (2012.01) | |

(52) U.S. Cl.
CPC .......... *G06F 40/253* (2020.01); *G06F 40/166* (2020.01); *G06F 40/289* (2020.01); *G06N 20/00* (2019.01); *G06Q 10/1053* (2013.01)

(58) Field of Classification Search
CPC .... G06F 40/211; G06F 40/253; G06F 40/268; G06F 40/284; G06F 40/30
See application file for complete search history.

(56) References Cited

U.S. PATENT DOCUMENTS

| | | |
|---|---|---|
| 7,472,097 B1 | 12/2008 | Scarborough et al. |
| 9,665,641 B1 | 5/2017 | Zhang |
| 10,185,712 B2 * | 1/2019 | Gidney ................. G06F 40/289 |
| 2005/0004905 A1 | 1/2005 | Dresden |
| 2005/0086186 A1 | 4/2005 | Sullivan et al. |

(Continued)

OTHER PUBLICATIONS

International Application No. PCT/US2020/012317, International Search Report and Written Opinion dated Apr. 9, 2020, 8 pages.

(Continued)

*Primary Examiner* — Lamont M Spooner
(74) *Attorney, Agent, or Firm* — Zhong Law, LLC

(57) ABSTRACT

An intelligent system and method for analyzing documents and suggesting corrections based on diversity criteria include a processing device to analyze a job document, using a machine learning model, to identify a first expression representing a first qualification requirement favorable to a first class of applicants than a second class of applicants according to a diversity metric, responsive to identifying the first expression, determine, using a semantic relation map, a second expression representing a second qualification requirement that is less favorable to the first class of applicants when compared to the first expression, and responsive to determining that the second expression, present the second expression on the interface device as a suggested replacement to the first expression in the job document.

20 Claims, 5 Drawing Sheets

(56) References Cited

U.S. PATENT DOCUMENTS

| | | |
|---|---|---|
| 2005/0216295 A1 | 9/2005 | Abrahamsohn |
| 2005/0261956 A1 | 11/2005 | Kato |
| 2006/0235884 A1 | 10/2006 | Pfenniger et al. |
| 2006/0271421 A1* | 11/2006 | Steneker ........ G06Q 10/063112 705/7.14 |
| 2007/0047802 A1 | 3/2007 | Puri |
| 2007/0112585 A1 | 5/2007 | Breiter et al. |
| 2009/0144075 A1 | 6/2009 | Flinn et al. |
| 2010/0153149 A1* | 6/2010 | Prigge ................. G06Q 10/06 705/7.11 |
| 2010/0153150 A1* | 6/2010 | Prigge ................ G06Q 10/063 705/7.11 |
| 2011/0055098 A1 | 3/2011 | Stewart |
| 2011/0276505 A1 | 11/2011 | Schmitt |
| 2013/0096991 A1 | 4/2013 | Gardner et al. |
| 2013/0290208 A1 | 10/2013 | Bonmassar et al. |
| 2014/0039991 A1* | 2/2014 | Gates, III ........... G06Q 30/0241 705/14.4 |
| 2014/0122355 A1 | 5/2014 | Hardtke et al. |
| 2014/0282586 A1 | 9/2014 | Shear et al. |
| 2014/0330734 A1 | 11/2014 | Sung et al. |
| 2015/0142711 A1 | 5/2015 | Pinckney et al. |
| 2015/0161567 A1 | 6/2015 | Mondal et al. |
| 2015/0178682 A1 | 6/2015 | Matthews et al. |
| 2015/0244850 A1 | 8/2015 | Rodriguez et al. |
| 2015/0309986 A1* | 10/2015 | Brav ..................... G06Q 50/01 707/739 |
| 2015/0317610 A1 | 11/2015 | Rao et al. |
| 2016/0012395 A1 | 1/2016 | Omar |
| 2016/0034853 A1 | 2/2016 | Wang et al. |
| 2016/0055457 A1* | 2/2016 | Mather .............. G06Q 10/1053 705/321 |
| 2016/0098686 A1 | 4/2016 | Younger |
| 2017/0061081 A1 | 3/2017 | Jagannathan et al. |
| 2017/0243162 A1 | 8/2017 | Gavrielides et al. |
| 2017/0344555 A1 | 11/2017 | Yan et al. |
| 2017/0357945 A1 | 12/2017 | Ashkenazi et al. |
| 2018/0039946 A1 | 2/2018 | Bolte et al. |
| 2018/0150484 A1* | 5/2018 | Dupey ................... G06N 7/005 |
| 2018/0218330 A1 | 8/2018 | Choudhary et al. |
| 2018/0232751 A1 | 8/2018 | Terhark et al. |
| 2018/0308061 A1 | 10/2018 | Jadda et al. |
| 2018/0357557 A1 | 12/2018 | Williams et al. |
| 2018/0373691 A1* | 12/2018 | Alba .................... G06F 40/247 |
| 2019/0066056 A1 | 2/2019 | Gomez et al. |
| 2019/0114593 A1 | 4/2019 | Champaneria |
| 2019/0197487 A1 | 6/2019 | Jersin et al. |
| 2019/0205838 A1 | 7/2019 | Fang et al. |
| 2020/0007336 A1 | 1/2020 | Wengel |
| 2020/0065769 A1 | 2/2020 | Gupta et al. |
| 2020/0117582 A1 | 4/2020 | Srivastava et al. |
| 2020/0160050 A1 | 5/2020 | Bhotika et al. |
| 2020/0233910 A1* | 7/2020 | Bhide .................. G06F 40/205 |

OTHER PUBLICATIONS

Pedreschi et al., "Discrimination-Aware Data Mining," Aug. 24-27, 2008, KDD 08, Las Vegas, Nevada, 9 pages.

Customerglu "Hire the best candidate for your Company using Artificial Intelligence" (2016), medium.com/SCustomerGlu, 2016, 5 pages.

Barbara Depompa, "Time for a Diversity 'Reboot'", SC Magazine 29:4: 26-29, 2018, Haymarket Media, Inc., pp. 1-4.

Elejalde-Ruiz, What Resume? Hiring is in the Midst of a Tech Revolution; Cutting Costs, Turnover, Eliminating Bias, South Florida Sun-Sentinel, 2018, pp. 1-3.

Sarah K. White, 4 Ways Technology has Changed Recruitment—For Better (and Worse), CIO CXO Media, Inc., 2017, pp. 1-3.

Sarah Dobson, "Feds Try to Blank Out Bias", Canadian HR Reporter 30, 9, HAB Press Limited, 2017, pp. 1-3.

David Hausman, "How Congress Could Reduce Job Discrimination by Promoting Anonymous Hiring", Stanford Law Review 64.5, 2012, pp. 1343-1369, Stanford University, Stanford Law School.

Hardt et al. "Equality of Opportunity in Supervised Learning," arXiv:1610.02413v1, Oct. 7, 2016, 22 pages.

Liu et al., "Delayed Impact of Fair Machine Learning," arXiv:1803.04383v2, Apr. 7, 2018, 37 pages.

Dixon et al., "Measuring and Mitigating Unintended Bias in Text Classification," Proceeding of the 2018 AAAI/ACM Conf. on AI, Ethics, and Society, Feb. 2-3, 2018, 7 pages.

* cited by examiner

SYSTEM, METHOD, AND COMPUTER PROGRAM FOR USING MACHINE LEARNING TO CALIBRATE JOB DESCRIPTION BASED ON DIVERSITY CRITERIA

CROSS-REFERENCE TO RELATED APPLICATION

This is a continuation application of PCT/US2020/012317 filed Jan. 6, 2020, the content of which is incorporated by reference in its entirety.

TECHNICAL FIELD

The present disclosure relates to using technical solutions to facilitate organizations to achieve diversity goals, and in particular to a system, method, and storage medium including executable computer programs for using machine learning technologies to calibrate a job description based on diversity criteria.

BACKGROUND

A diverse workforce is a goal for many organizations. Workforce diversity may generate many benefits such as diverse perspectives, high creativity, high innovation, enhancing organization reputations, and increasing marketing power. Realizing these benefits, many organizations may try to achieve workforce diversity by proactively balancing the composition of the workforce against target diversity criteria. For example, an organization may manage its hiring process, career advancement process, and retention process to achieve workforce diversity. The diversity may be measured in terms of genders, races, sexual orientations, and/or nationalities of employees. Certain fields such as computer engineering may experience shortage of talents due to explosive growths in these fields. There may be a strong competition from different hiring organizations for talents while the number of talents on the market are limited. This limitation may increase the difficulty to achieve workforce diversity through hiring.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
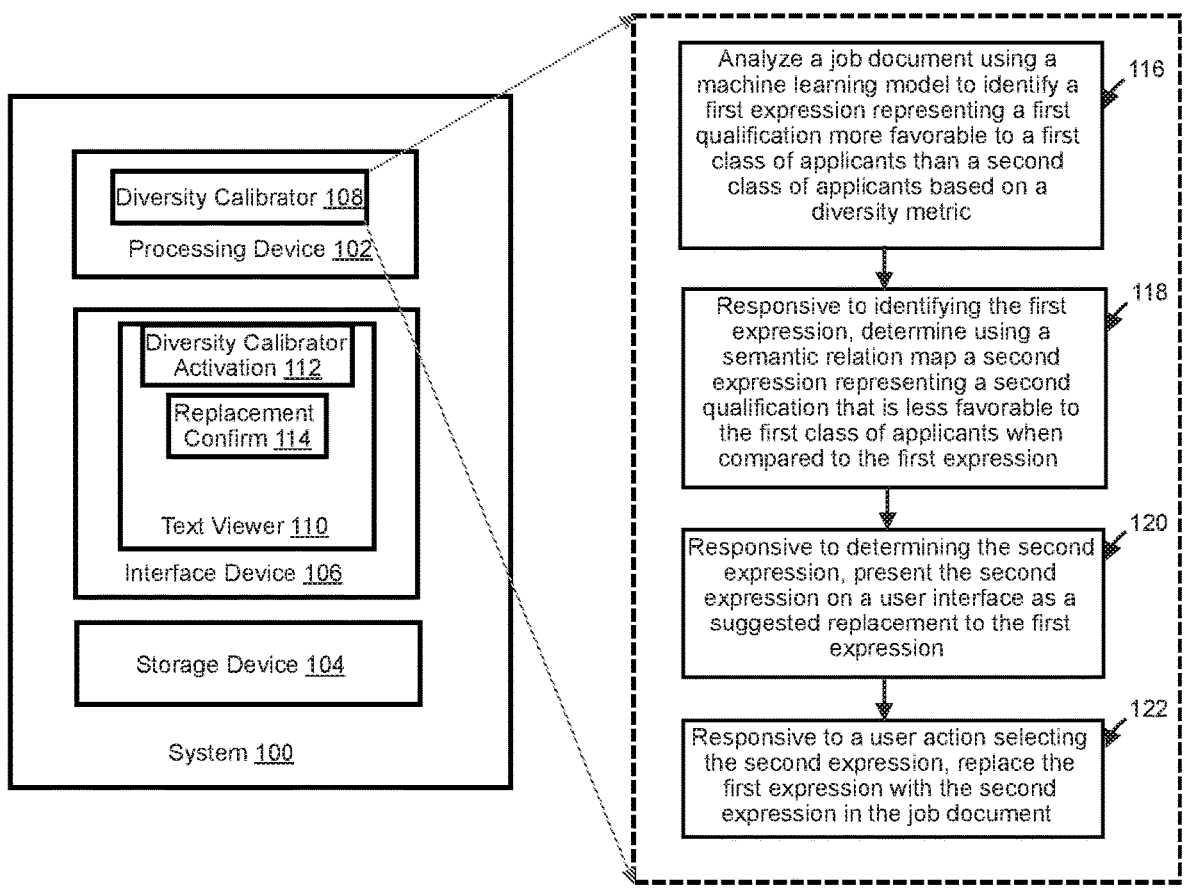
FIG. 1 illustrates a system for providing a diversity calibrator according to an implementation of the disclosure.

Therefore, there is a need for technical solutions that can facilitate an organization to achieve its workforce diversity goals. As discussed above, one aspect of the technical solutions is to encourage and attract under-represented groups to apply for job openings posted by the organization. For example, women may traditionally constitute a small percentage of workforce in an engineering field (e.g., computer engineering). To achieve a workforce diversity goal (e.g., increasing women engineers in an organization to a certain percentage), an organization may need to proactively try to hire more qualified woman engineers to fill its job openings. One way to hire more woman engineers is to increase the number of woman candidates applying for the job openings posted by the organization so that the organization can have a bigger pool of woman candidates to choose from. This may require job descriptions written in a way that is does not dissuade diversity candidates from submitting job applications.

Implementations of the disclosure include hardware or software tools incorporating machine learning, big data, and natural language processing technologies. In comparison, any given human being comes with his or her own biases and does not possess, at scale, capacity, discipline, and skills to ingest and produce statistically diverse implications for a large pool of words or phrases. Further, the implications may need systematic updates as time goes on. In one implementation, the software tool may include code that, when executed by a processing device, may identify, based on a machine learning model, linguistic expressions representing one or more qualifications in a job description that may be more favorable to a well-represented class of applicants than an under-represented class of applicants according to a diversity metric. Responsive to identifying the linguistic expressions, the software tool may determine, based on the machine learning model, substitute expressions to the existing linguistic expressions, where the substitute expressions may represent substitute qualifications that are determined based on a semantic similarity measurement to be close to the one or more qualifications and are more favorable to the under-represented class of applicants (or less favorable to the well-represented class). Responsive to determining the substitute expressions, the software tool may present on an interface device the substitute expressions to allow a user making a decision of whether to replace the one or more qualifications with the substitute qualifications in the job description or automatically replace with one of the substitute qualifications in the job description. In this way, the software tool may facilitate to generate a job description that is more appealing to the under-represented class of applicants, thus attracting more under-represented applicants to apply for the job openings.

In one implementation, the software tool includes a diversity calibrator that may be a plug-in software component to a text viewer such as a word processing software (e.g., Microsoft Word) or a web browser such as Safari. The text viewer may be used to edit and/or present the text of the job descriptions. When the diversity calibrator is activated by a user action, the diversity calibrator may analyze, based on a machine learning model, the text of the job description to identify a first expression that predominantly associated with a first class of applicants, where the first class of applicants may be already well represented in the workforce of the organization according to a diversity metric. Responsive to identifying the first expression that predominantly associated with a first class of applicants, the diversity calibrator may determine, using a semantic relation map, a second expression that is a semantically close to the first expression and is closely associated with a second class of applicants, wherein the second class of applicants may be underrepresented in the workforce of the organization according to the diversity metric. The diversity calibrator may then present the second expression as a potential substitute to the first expression on the text viewer, allowing the user to select the second expression as a replacement to the first expression in the job description. In this way, the diversity calibrator may help improve the job description to attract more diverse applicants.

In one application, a job description may contain expressions whose meanings represent job skills needed for the job opening. The machine learning model may be used to determine that a first skill presented by the first expression may be more favorable to male applicants (e.g., more male applicants possess the first skill based on the machine learning model trained using historical data). To encourage female applicants to apply for job openings, the diversity calibrator may use a semantic relation map to determine a second expression representing a second skill that is more favorable to female applicants, or less favorable to the male applicants, or well balanced between female and male applicants. The diversity calibrator may present the second expression as a suggestion on a user interface as a replacement to the first expression. Alternatively, the diversity calibrator may automatically replace the first expression using the second expression.

FIG. 1 illustrates a system 100 for providing a diversity calibrator according to an implementation of the disclosure. System 100 can be a standalone computer system or a networked computing resource implemented in a computing cloud. Referring to FIG. 1, system 100 may include a processing device 102, a storage device 104, and an interface device 106, where the storage device 104 and the interface device 106 are communicatively coupled to processing device 102.

Processing device 102 can be a hardware processor such as a central processing unit (CPU), a graphic processing unit (GPU), or an accelerator circuit. Interface device 106 can be a display such as a touch screen of a desktop, laptop, or smart phone. Storage device 104 can be a memory device, a hard disc, or a cloud storage connected to processing device 102 through a network interface card (not shown).

Processing device 102 can be a programmable device that may be programmed to implement a text viewer 110 presented on interface device 106. Text viewer 110 allows a user using an input device (e.g., a keyboard, a mouse, and/or a touch screen) to edit a job document. In one implementation, the job document can be a job description including linguistic expressions representing one or more qualification requirements needed for performing the job. The one or more qualification requirements can be specific skills such as, for example, hardware skills or software programming skills. Therefore, a user may use the text viewer to write, edit, or review the job description.

In one implementation, processing device 102 may implement text viewer 110 including an add-on feature referred to as the diversity calibrator 108. In one implementation, diversity calibrator 108 can be incorporated into text viewer 110 as an add-on function and can be activated by a diversity calibration activation element 112 presented on text viewer 110. In another implementation, diversity calibrator 108 may run as a daemon program in the background to monitor text (both being entered or already in existence) in the document. Diversity calibrator 108, when executed by processing device 102, may analyze the job document using a machine learning model to identify a first expression representing a first qualification requirement that is more favorable to a first class of applicants than to a second class of applicants according to a diversity metric 116; responsive to identifying the first expression, determine using a semantic relation map a second expression representing a second qualification requirement that is less favorable to the first class of applicants when compared with the first expression 118; responsive to determining the second expression, present the second expression on an interface device as a suggested replacement to the first expression 120; and responsive to a user action selecting the second expression, replace the first expression with the second expression in the job document 122.

The following sections describe diversity calibrator 108 in detail. Diversity calibrator 108, when activated (e.g., by diversity calibrator activation element 112 presented in conjunction with text viewer 110), may, at 116, analyze a job document presented in text viewer 110 using a machine learning model. The job document can be a job description for a job opening that an organization needs to fill. The job description may contain linguistic expressions representing qualification requirements for the job opening. The qualification requirements can be aspects related to the job. The aspects can be a job title, job skills, job responsibilities, and textual descriptions of different aspects of the job. An example job document may include a job title of "Lead Frontend Engineer," job skills of "C++, Java, Python, Algorithm, SQL, Linux, Android," job responsibilities of "Develop frontend component platform," "Work closely with design to create pixel-perfect sites," and "Build delightful web user interfaces for our consumers," and textual descriptions of a summary of different aspects of the job. Thus, the job document may contain linguistic expressions pertaining to the different aspects of the job. The linguistic expressions can be in any language such as English, German, French. The linguistic expressions can be a word, a phrase, or a sentence containing one or more words associated with certain semantic meanings.

In one implementation, at 116, the diversity calibrator may analyze the job document using a machine learning model to identify a first expression representing a first qualification requirement that is more favorable to a first class applicants when compared to a second class of applicants based on a diversity metric. As discussed above, the organization may desire to achieve a diverse workforce to reap the benefits of workforce diversity. Applicants to job openings may fall into different diversity classes. Common categories of diversity classes may include the gender classes (e.g., Male vs. Female), race classes (e.g., White, African Americans, Hispanic, Asian), nation origin classes (e.g., U.S., Canada, India, China, Europe Union). An applicant may be classified into one or more categories of classes. For example, an applicant can be classified as a white male Canadian resident; another applicant can be an African American female U.S. resident. The organization may be aware that certain classes are well-represented in its workforce while other classes are under-presented in its workforce according to a diversity metric. The diversity metric can be target percentage ranges of different classes of classes of employees hired by the organization. For example, the organization may want to increase the hires of female technical staffs to achieve a better mix between male and female technical staffs. This may require generating job descriptions in a way that is free of bias favoring male technical staffs.

Implementations of the disclosure are based on the realization that some qualification requirements in the job document may be inherently more favorable to one class of applicants than to another class of applicants. When the bias is against an under-represented class of applicants, these qualification requirements may discourage the under-represented class of applicants from applying for the job openings, thus countering against the organization's diversity goal. In one implementation, diversity calibrator 108 may use a machine learning model previously trained using training data to identify expressions representing qualification requirements that are more favorable to a well-represented class of applicants. Responsive to identifying the expressions representing qualifications that are more favorable to a well-represented class of applicants, diversity calibrator 108 may search for substitute expressions that are less biased against the under-represented class of applicants but semantically similar to the expression so that diversity calibrator 108 may present the substitute expressions on interface device 106 as replacements to the expressions.

Figure 2:
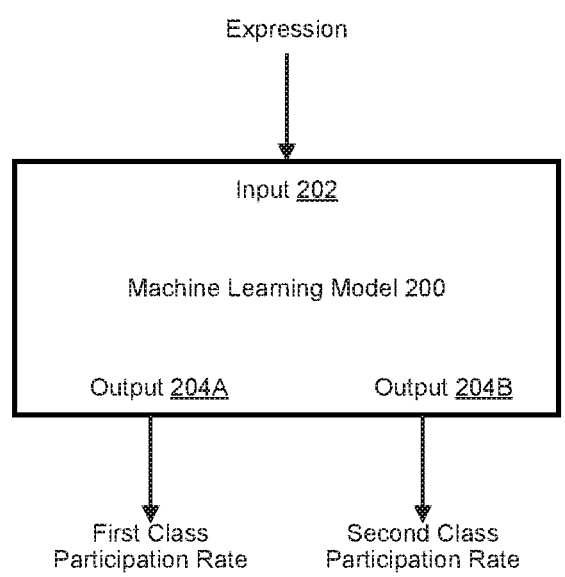
FIG. 2 illustrates a machine learning model according to an implementation of the disclosure.

The machine learning model can be a parameterized representation that may be used to calculate a participation rate by each class of applicants with respect to an input. The machine learning model can be a suitable statistical model or a deep neural network (DNN). FIG. 2 illustrates a machine learning model 200 according to an implementation of the disclosure. In one implementation, machine learning model 200 may be a deep neural network that may include multiple layers, in particular including an input layer for receiving data inputs, an output layer for generating outputs, and one or more hidden layers that each includes linear or non-linear computation elements (referred to as neurons) to perform the DNN computation propagated from the input layer to the output layer that may transform the data inputs to the outputs. Two adjacent layers may be connected by edges. Each of the edges may be associated with a parameter value (referred to as a synaptic weight value) that provide a scale factor to the output of a neuron in a prior layer as an input to one or more neurons in a subsequent layer.

Referring to FIG. 2, machine learning model 200 may include an input layer including an input 202 to receive a linguistic expression. The semantic meaning of the linguistic expression represents a qualification requirement in a job document. The machine learning model 200 may include an output layer including outputs 204A, 204B to produce class participation rates, where a class participation rate indicates a percentage of the qualification requirement (represented by the expression received at input 202) possessed by the applicants in the corresponding class. In a two-class example as shown in FIG. 2, a first class may represent male applicants, and a second class may represent female applicants. Responsive to receiving an expression representing a qualification requirement (e.g., a job skill) at input 202, processing device 102 may execute machine learning model 200 to calculate a first class participation rate at output 204A and a second class participation rate at output 204B, where the first class participation rate represents a predicted percentage of applicants in the first class (e.g., male) possessing the qualification requirement, and the second class participation rate represents a predicted percentage of applicants in the second class (e.g., male) possessing the qualification requirement. When the first class participation rate is substantially higher than the second class participation rate (e.g., the difference between the first and second class participation rates is larger than a threshold value), the qualification requirement represented by the expression is more favorable to the first class than the second class of applicants. Conversely, when the second class participation rate is substantially higher than the first class participation rate, the qualification requirement represented by the expression is more favorable to the second class than the first class of applicants. When the first class participation rate and the second class participation rate are close (e.g., the difference between the first and second class participation rates is smaller than the threshold value), the qualification requirement represented by the expression is deemed neural. Machine learning model 200 as shown in FIG. 2 is an illustrative model that generates class participation rates for two classes. Implementations of the disclosure are not limited to two classes. For example, the output can be more than two classes to indicate class participation rates for different classes of applicants from different races.

Machine learning in this disclosure refers to methods implemented on hardware processing device that uses statistical techniques and/or artificial neural networks to give computer the ability to "learn" (i.e., progressively improve performance on a specific task) from data without being explicitly programmed. The machine learning may use a parameterized model (referred to as "machine learning model") that may be deployed using supervised learning/semi-supervised learning, unsupervised learning, or reinforced learning methods. Supervised/semi-supervised learning methods may train the machine learning models using labeled training examples. To perform a task using supervised machine learning model, a computer may use examples (commonly referred to as "training data") to test the machine learning model and to adjust parameters of the machine learning model based on a performance measurement (e.g., the error rate). The process to adjust the parameters of the machine learning model (commonly referred to as "train the machine learning model") may generate a specific model that is to perform the practical task it is trained for. After training, the computer may receive new data inputs associated with the task and calculate, based on the trained machine learning model, an estimated output for the machine learning model that predicts an outcome for the task. Each training example may include input data and the corresponding desired output data, where the data can be in a suitable form such as a vector of numerical alphanumerical symbols.

The learning process may be an iterative process. The process may include a forward propagation process to calculate an output based on the machine learning model and the input data fed into the machine learning model, and then calculate a difference between the desired output data and the calculated output data. The process may further include a backpropagation process to adjust parameters of the machine learning model based on the calculated difference.

In one implementation, the training data may include profiles (e.g., a resumes) of persons known to belong to different classes (e.g., male or female). These persons can be current employees or ex-employees of the organization. Alternatively, given a profile of a person of unknown class, the processing device may execute a class predictor application to predict which class a profile belongs to (e.g., using the candidate's name in the resume as features to predict the gender via a pre-trained gender classifier consisting of a one-layer neural network applying a probability threshold to the soft output of such classifier), and then the profile and the predicted class may be used as a piece of training data. The profiles may include expressions representing different qualifications. The training process may exact an expression from a profile in the training data, and place the expression into a bin associated with the corresponding class. The training process may repeat the same for each expression in the profiles of the training data, and place them in the corresponding bin. The training process may calculate the class participation rates for different expressions. For example, a bin A associated with a first class may contain X items of an expression and a bin B associated with a second class may contain Y items of the expression, with X and Y each then normalized by dividing each by the unique items of expressions in the associated bin, resulting in X' and Y'. The first class participation rate can be calculated as X'/(X'+Y'); the second class participation rate can be calculated as Y'/(X'+Y').

In another way, the training process may construct parameterized machine learning model 200 to calculate the class participation rates based on a given job skill, alone or with other input features. Such other input features may be the hiring department, whether it is sales, engineering, finance, legal, human resource, or another department, the geographic region, and the language of the job profile. A decision tree may be trained based on training sets of existing job profiles with these features. A soft-output decision-tree classifier may be trained with the output being a soft likelihood value of male versus female, input being a vector representation of the job skill along with other input features providing such additional context. In training machine learning model 200, the input training set may include existing job descriptions in lieu of or in addition to exiting job profiles. Existing job descriptions may be mapped to applied candidates, each associated with known diversity classes, or if unknown, with predicted diversity classes.

Referring to FIG. 1, at 118, responsive to identifying the first expression that is more favorable to the first class of applicants, diversity calibrator 108 may determine a second expression representing a second qualification that is less favorable to the first class of applicants when compared to the first expression. When the first expression is more favorable to the first class which is well-represented in the workforce, diversity calibrator 108 may select one or more second expressions which are semantically similar to the first expression but less favorable to the first class of applicants when compared to the first expression.

The semantic similarity between two expressions may be determined using a semantic relation map. A semantic relation map includes a network of expressions that are connected based on their meanings, where distance between two expressions may indicate the semantic similarity between the two expressions. The closer two expressions in the semantic relation map, the more similar the two expressions in meaning. In one implementation, a semantic relation map may be constructed for a particular domain of knowledge. For example, a semantic relation map may be constructed in the context of job descriptions relating to the computer science domain. The domain-specific semantic relation map may be constructed by training using domain-specific training data or by pruning a generic semantic relation map using domain knowledge.

Figure 3:
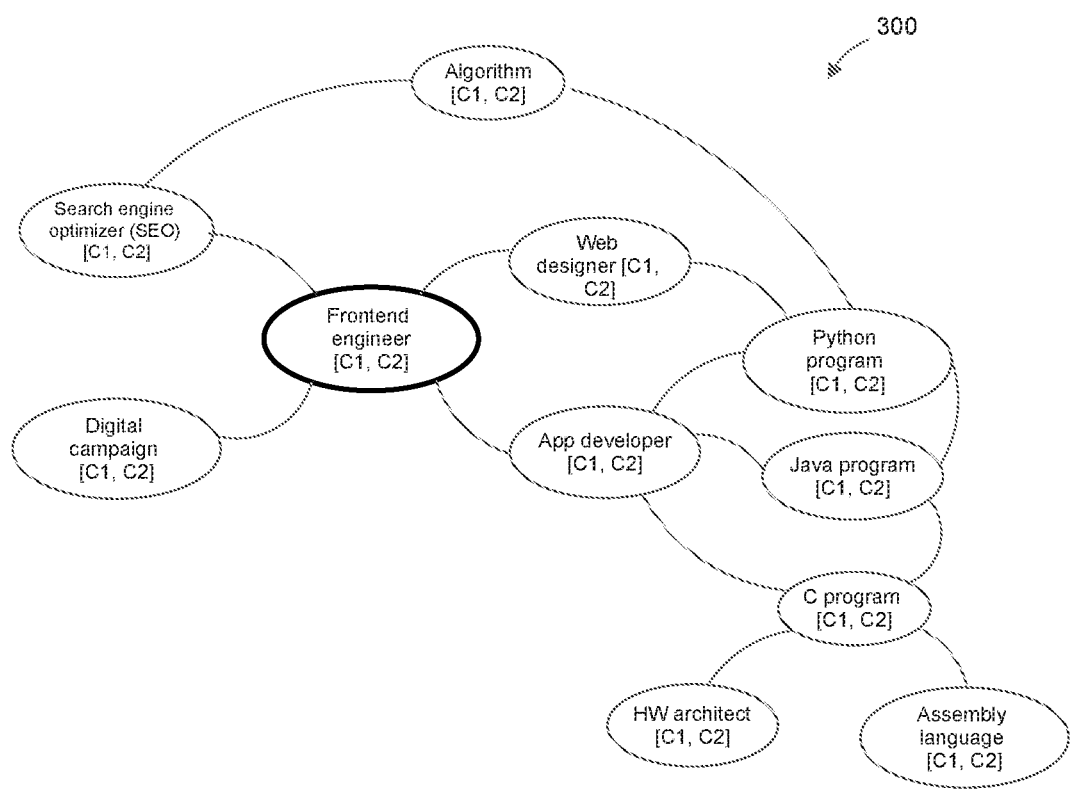
FIG. 3 illustrates an example semantic relation map for the domain of computer science.

FIG. 3 illustrates an example semantic relation map 300 for the domain of computer science. The semantic relation map 300 is an illustrative example for the purpose of explanation. As shown in FIG. 3, semantic relation map 300 may include expressions ("Frontend engineer," "Search engine optimizer (SEO)," "Digital campaign," "Algorithm," "Web designer," "Application developer," "Python program," "Java program," "C program," "Hardware architect," and "Assemble language") that are connected by links. The semantic similarity between two expressions can be determined by the shortest path (e.g., measured in terms of number of links) between the two expressions. For example, "Frontend engineer" is more similar to "Application engineer" than "C program" because the shortest path between "Frontend engineer" and "Application engineer" is one link while the shortest path between "Frontend engineer" and "C program" includes two links. Thus, for each expression extracted from a job document, diversity calibrator 108 may determine a set of similar expressions defined as those whose semantic similarities are within a link threshold (e.g., two links) in the semantic relation map.

The semantic relationship map may also be built with soft distances instead of counting links. One way to construct the map is to vectorize representations of word strings in the job descriptions. For instance, an n-gram model can be built from words or phrases, n being a positive integer. The n-gram can be viewed as a type of probabilistic model for predicting the next item given the n−1 observations. With a 3-gram model, English letters are modelled in a $26^3$-dimension vector space, ignoring upper and lower cases, space, and other special characters. For example, the string "Web designer" contains 3-grams such as "web," "des," "esi," "sig," and so on. Any string can be mapped to the vector space by vectorizing it into such n-grams. Two vectors representing two strings have a distance between them. One measure of matching similarity between the two vectors is called dot product or cosine similarity. Let A be a M-dimension vector of components $A_i$, and B be another M-dimension vector of components $B_i$, where i takes on the values from 1 to M. The dot product of A and B is expressed as A·B/‖A‖*‖B‖, where the · operator represents the dot product of two vectors, ‖ ‖ operator represents the magnitude operator, and * is the scaler product operator. Given a carefully selected corpus of words for certain contextual concept, a dictionary of n-grams may be built to represent the probabilistic occurrence of the n-grams. Words are translated into a vectorized representation of the n-grams. Similarity between any pair of two words is the soft distance, which informs adjacent words or phrases for the context. Words that appear out of the dictionary may be ignored or handled as special cases. Other forms of word embedding than building explicit n-grams can also be used to vectorize words or phrases, including embedding through training neutral network hidden-layers.

Once words and phrases become measurable in semantic distances under a constructed semantic map, a user interface may be presented to a user that adjacent job skills can be substituted if one job skill has a skewed correlation with one diversity class than another adjacency skill. The prompting of such alternatives gives valuable insight and freedom when composing a job description by human writers. It provides a higher degree of confidence in better targeting for diversity hires. To efficiently improve job descriptions at scale, one implementation of the system can automatically go through existing job descriptions without manual interaction; that is, for expressions that are flagged to have highly-skewed class participation rates toward one diversity class, the system can automatically select and substitute other expressions that are both adjacent in semantic meaning and have balanced class participation rates.

In one implementation, diversity calibrator 108 may calculate class participation rates (C1, C2) for each expression in the semantic relation map using the machine learning model 200 as described in conjunction with FIG. 2. Thus, diversity calibrator 108 may determine, based on the class participation rates (C1, C2), which similar expressions are less favorable to a well-represented class and more favorable to the under-represented class. These similar expressions are candidates for substituting the first expression identified at 116. For example, diversity calibrator 108 may determine that "Frontend engineer" extracted from the job document is associated with first and second class participation rates of C1=68%, and C2=32%, thus more favoring to the first class of male applicants. Diversity calibrator 108 may determine, based on the semantic relation map 300, that "Web designer," "Application developer," "Search engine optimizer (SEO)," and "Digital campaign" are similar to "Frontend engineer." Further, diversity calibrator 108 may determine that "Web designer," "Application developer," "Search engine optimizer (SEO)," and "Digital campaign" are associated with the following class participation rates (C1, C2) of (45%, 55%), (55%, 45%), (70%, 30%), (35%, 65%), respectively. According to the associated class participation rates, "Digital campaign," "Web designer," and "Application developer" are qualification requirements similar to "Frontend engineer" but are less favorable to male applicants. Thus, "Web designer," "Application developer," and "Digital campaign" can be potential replacements for "Frontend engineer" because these potential replacements the attention of more female applicants.

Diversity calibrator 108 may further, at 120, present the second expressions (e.g., the identified "Digital campaign," "Web designer," or "Application developer") on interface device 106 as suggested replacements to the first expression responsive to determining these expressions as similar but less favorable to the first class of applicants. In one implementation, diversity calibrator 108 may identify one or more expressions including qualification requirements (e.g., "Frontend engineer") in the job document more favorable to the class of applicants (e.g., male applicants) based on the first class participation rate. Responsive to identifying the one or more expressions, diversity calibrator 108 may issue a display instruction causing the one or more expression to be highlighted (e.g., red highlight) to notify the user that these expressions may be biased and may need replacements. Responsive to a further user interaction with the highlighted expressions (e.g., moving the mouse to the highlighted expressions), diversity calibrator 108 may issue another display instruction causing presentation of the suggested replacement expressions that are less favorable to the first class of applicants. In one implementation, diversity calibrator 108 may cause to present the class participation rates associated with the one or more expressions and their corresponding suggested replacement expressions, thus presenting quantified diversity metrics for helping the user make replacement decisions.

The user may use replacement confirmation element 114 presented with text viewer 110 to confirm a particular replacement expression selected from one of suggested replacements. Responsive to the user action selecting the replacement expression (e.g., using replacement confirmation element 114), at 122, diversity calibrator 108 may use the selected replacement expression to replace the first expression, thus improving the job document based on the diversity metric.

Figure 4:
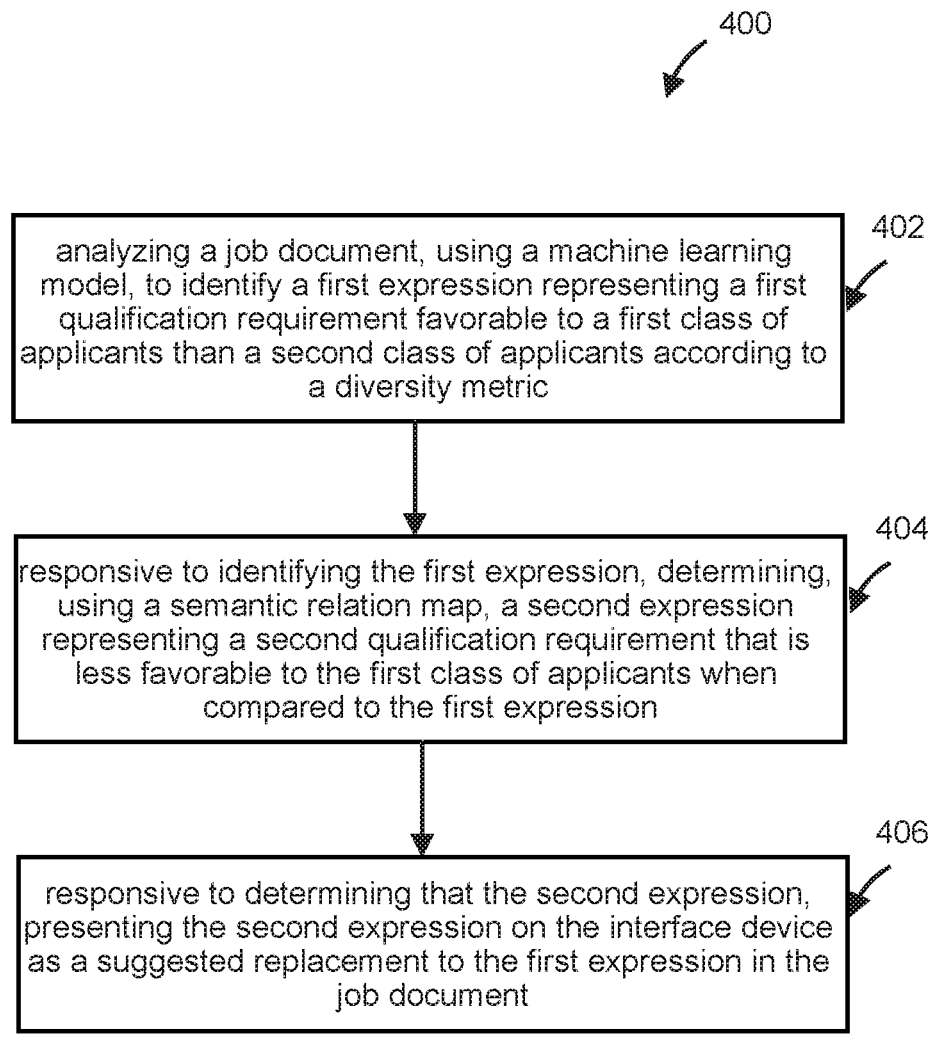
FIG. 4 illustrates a flowchart of a method to perform diversity calibration according to an implementation of the disclosure.

FIG. 4 illustrates a flowchart of a method 400 to perform diversity calibration according to an implementation of the disclosure. Method 400 may be performed by processing devices that may comprise hardware (e.g., circuitry, dedicated logic), computer readable instructions (e.g., run on a general purpose computer system or a dedicated machine), or a combination of both. Method 400 and each of its individual functions, routines, subroutines, or operations may be performed by one or more processors of the computer device executing the method. In certain implementations, method 400 may be performed by a single processing thread. Alternatively, method 400 may be performed by two or more processing threads, each thread executing one or more individual functions, routines, subroutines, or operations of the method.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be needed to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 400 may be performed by a processing device 102 executing diversity calibrator 108 as shown in FIG. 1.

As shown in FIG. 4, processing device 102 may, at 402, analyze a job document, using a machine learning model, to identify a first expression representing a first qualification requirement favorable to a first class of applicants than a second class of applicants according to a diversity metric.

At 404, processing device 102 may, responsive to identifying the first expression, determine, using a semantic relation map, a second expression representing a second qualification requirement that is less favorable to the first class of applicants when compared to the first expression.

At 406, processing device 102 may, responsive to determining that the second expression, present the second expression on the interface device as a suggested replacement to the first expression in the job document.

Figure 5:
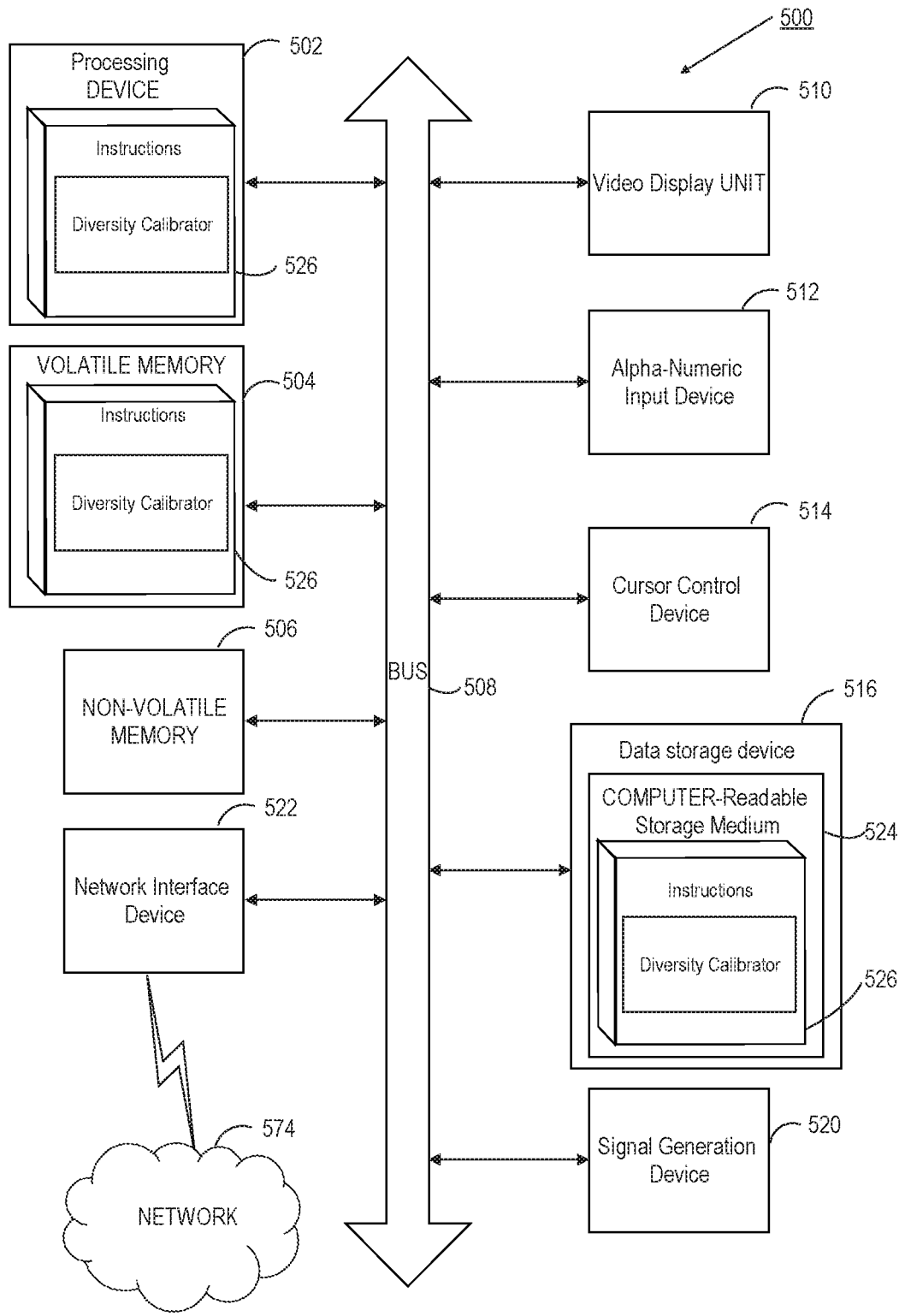
FIG. 5 depicts a block diagram of a computer system operating in accordance with one or more aspects of the present disclosure.

FIG. 5 depicts a block diagram of a computer system operating in accordance with one or more aspects of the present disclosure. In various illustrative examples, computer system 500 may correspond to the processing device 102 of FIG. 1.

In certain implementations, computer system 500 may be connected (e.g., via a network, such as a Local Area Network (LAN), an intranet, an extranet, or the Internet) to other computer systems. Computer system 500 may operate in the capacity of a server or a client computer in a client-server environment, or as a peer computer in a peer-to-peer or distributed network environment. Computer system 500 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 500 may include a processing device 502, a volatile memory 504 (e.g., random access memory (RAM)), a non-volatile memory 506 (e.g., read-only memory (ROM) or electrically-erasable programmable ROM (EEPROM)), and a data storage device 516, which may communicate with each other via a bus 508.

Processing device 502 may be provided by one or more processors such as a general purpose processor (such as, for example, a complex instruction set computing (CISC)

microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 500 may further include a network interface device 522. Computer system 500 also may include a video display unit 510 (e.g., an LCD), an alphanumeric input device 512 (e.g., a keyboard), a cursor control device 514 (e.g., a mouse), and a signal generation device 520.

Data storage device 516 may include a non-transitory computer-readable storage medium 524 on which may store instructions 526 encoding any one or more of the methods or functions described herein, including instructions of the diversity calibrator 108 of FIG. 1 for implementing method 400.

Instructions 526 may also reside, completely or partially, within volatile memory 504 and/or within processing device 502 during execution thereof by computer system 500, hence, volatile memory 504 and processing device 502 may also constitute machine-readable storage media.

While computer-readable storage medium 524 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "receiving," "associating," "determining," "updating" or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform method 300 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. An intelligent system implemented by one or more computers for analyzing qualification requirements in job documents and suggesting corrections based on diversity criteria, the one or more computers comprising:
   a storage device;
   an interface device; and
   a processing device, communicatively connected to the storage device and the interface device, to:
      analyze a job document, using a machine learning model, to identify a first expression representing a first qualification requirement favorable to a first class of applicants than a second class of applicants according to a diversity metric, wherein the first class is well-represented in a workforce and the second class is under-represented in the workforce, and the job document is a job description for a job opening with an organization;
      responsive to identifying the first expression, determine, using a semantic relation map and the machine learning model, a second expression representing a second qualification requirement that is less favorable to the first class of applicants but more favorable to the second class of applicants when compared to the first expression wherein to determine, using the semantic relation map, the second expression, the processing device is further to:
         determine a distance between a first representation of the first expression and a second representation of the second expression on the semantic relation map;
         determine the second expression responsive to determining, based on the distance between the first representation and the second representation on the semantic relation map, that the second expression is similar to the first expression; and
         determine, using the machine learning model, that the second expression is less favorable to the first class of applicants but more favorable to the second class of applicants when compared to the first expression; and
      responsive to determining the second expression, present the second expression on the interface device as a suggested replacement to the first expression in the job document.

2. The intelligent system of claim 1, wherein the interface device is configured to automatically search for a third expression that statistically favors the first class of applicants over the second class of applicants by exceeding a pre-determined threshold and replace the third expression with a fourth expression that is identified to be close to the third expression in the semantic relation map and falls below the pre-determined threshold.

3. The intelligent system of claim 1, wherein to analyze the job document, using a machine learning model, to identify a first expression representing a first qualification requirement favorable to a first class of applicants than a second class of applicants according to a diversity metric, the processing device is to:
parse the job document to identify the first expression representing the first qualification;
calculate, using the machine learning model, a first class participation rate for the first expression that represents a likelihood of applicants of the first class of applicants possessing the first qualification requirement, and a second class participation rate for the first expression that presents a likelihood of applicants of the second class of applicants possessing the first qualification requirement; and
determine that a difference between the first class participation rate and the second class participation rate is greater than a first threshold value.

4. The intelligent system of claim 1, wherein to determine a distance between a first representation of the first expression and a second representation of the second expression on the semantic relation map, the processing device is further to:
determine the distance based on a number of links between the first representation and the second representation on the semantic relation map; or
determine the distance based on an n-gram model constructed from the job description, and wherein the semantic relation map is constructed by training using a domain-specific knowledge.

5. The intelligent system of claim 1, wherein to determine, using a semantic relation map and the machine learning model, a second expression representing a second qualification requirement that is less favorable to the first class of applicants but more favorable to the second class of applicants when compared to the first expression, the processing device is to:
select the second expression using the semantic relation map;
calculate, using the machine learning model, the first class participation rate for the second expression, and the second class participation rate for the second expression, wherein a class participation rate indicates a percentage of an expression representing a qualification requirement possessed by applicants in a corresponding class; and
determine the second expression based on the first class participation rate and the second class participation rate.

6. The intelligent system of claim 5, wherein the processing device is further to:
determine, based on the semantic relation map, that a semantic similarity between the first expression and the second expression is smaller than a second threshold value; and
select the second expression.

7. The intelligent system of claim 1, wherein to present the second expression on the interface device as a suggested replacement to the first expression in the job document, the processing device is to:
present the first expression that statistically favors one class of applicants over another by exceeding a pre-determined threshold with highlight;
responsive to an interaction by an input device directed at the first expression, present the second expression on the interface device as the suggested replacement to the first expression.

8. The intelligent system of claim 7, wherein the processing device is to present the first expression with the first and second class participation rates associated with the first expression, and to present the second expression with the first and second class participation rates associated with the second expression.

9. The intelligent system of claim 1, wherein the diversity metric is to measure at least one of gender diversity, racial diversity, or national origin diversity in a workforce of an organization.

10. The intelligent system of claim 1, wherein the first expression is at least one of a word, a phrase, or a sentence in the job description.

11. A method for analyzing qualification requirements in job documents and suggesting corrections based on diversity criteria, the method comprising:
analyzing, by a processing device, a job document using a machine learning model to identify a first expression representing a first qualification requirement favorable to a first class of applicants than a second class of applicants according to a diversity metric, wherein the first class is well-represented in a workforce and the second class is under-represented in the workforce, and the job document is a job description for a job opening with an organization;
responsive to identifying the first expression, determining using a semantic relation map and the machine learning model, a second expression representing a second qualification requirement that is less favorable to the first class of applicants but more favorable to the second class of applicants when compared to the first expression, wherein determining, using a semantic relation map and the machine learning model, a second expression comprises:
determining a distance between a first representation of the first expression and a second representation of the second expression on the semantic relation map;
determining the second expression responsive to determining, based on the distance between the first representation and the second representation on the semantic relation map, that the second expression is similar to the first expression; and
determining, using the machine learning model, that the second expression is less favorable to the first class of applicants but more favorable to the second class of applicants when compared to the first expression; and
responsive to determining the second expression, presenting the second expression on an interface device as a suggested replacement to the first expression in the job document.

12. The method of claim 11, further comprising:
automatically searching for a third expression that statistically favors the first class of applicants over the second class of applicants by exceeding a pre-determined threshold; and replacing the third expression with a fourth expression that is identified to be close to the third expression in the semantic relation map and falls below the predetermined threshold.

13. The method of claim 11, wherein analyzing, by a processing device, a job document using a machine learning model to identify a first expression representing a first qualification requirement favorable to the first class of applicants than a second class of applicants according to a diversity metric further comprises:
  parsing the job document to identify the first expression representing the first qualification;
  calculating, using the machine learning model, a first class participation rate for the first expression that represents a likelihood of applicants of the first class of applicants possessing the first qualification requirement, and a second class participation rate for the first expression that presents a likelihood of applicants of the second class of applicants possessing the first qualification requirement; and
  determining that a difference between the first class participation rate and the second class participation rate is greater than a first threshold value.

14. The method of claim 11, wherein determining a distance between a first representation of the first expression and a second representation of the second expression on the semantic relation map further comprises:
  determining the distance based on a number of links between the first representation and the second representation on the semantic relation map; or
  determining the distance based on an n-gram model constructed from the job description, and wherein the semantic relation map is constructed by training using a domain-specific knowledge.

15. The method of claim 11, wherein determining using a semantic relation map and the machine learning model, a second expression representing a second qualification requirement that is less favorable to the first class of applicants but more favorable to the second class of applicants when compared to the first expression further comprises:
  selecting the second expression using the semantic relation map;
  calculating, using the machine learning model, the first class participation rate for the second expression, and the second class participation rate for the second expression, wherein a class participation rate indicates a percentage of an expression representing a qualification requirement possessed by applicants in a corresponding class; and
  determining the second expression based on the first class participation rate and the second class participation rate.

16. The method of claim 15, further comprising:
  determining, based on the semantic relation map, that a semantic similarity between the first expression and the second expression is smaller than a second threshold value; and
  selecting the second expression.

17. The method of claim 15, wherein presenting the second expression on an interface device as a suggested replacement to the first expression in the job document comprises:
  presenting the first expression that statistically favors one class of applicants over another by exceeding a predetermined threshold with highlight; and
  responsive to an interaction by an input device directed at the first expression, presenting the second expression on the interface device as the suggested replacement to the first expression.

18. The method of claim 17, further comprising presenting the first expression with the first and second class participation rates associated with the first expression, and to present the second expression with the first and second class participation rates associated with the second expression.

19. The method of claim 11, wherein the diversity metric is to measure at least one of gender diversity, racial diversity, or national origin diversity in a workforce of an organization, and wherein the job document is a job description for a job opening with an organization, and wherein the first expression is at least one of a word, a phrase, or a sentence in the job description.

20. A machine-readable non-transitory storage media encoded with instructions that, when executed by one or more computers, cause the one or more computer to implement an intelligent system for analyzing qualification requirements in job documents and suggesting corrections based on diversity criteria, to:
  analyze a job document, using a machine learning model, to identify a first expression representing a first qualification requirement favorable to a first class of applicants than a second class of applicants according to a diversity metric, wherein the first class is well-represented in a workforce and the second class is underrepresented in the workforce, and the job document is a job description for a job opening with an organization;
  responsive to identifying the first expression, determine, using a semantic relation map and the machine learning model, a second expression representing a second qualification requirement that is less favorable to the first class of applicants but more favorable to the second class of applicants when compared to the first expression wherein to determine, using the semantic relation map, the second expression, the processing device is further to:
    determine a distance between a first representation of the first expression and a second representation of the second expression on the semantic relation map;
    determine the second expression responsive to determining, based on the distance between the first representation and the second representation on the semantic relation map, that the second expression is similar to the first expression; and
    determine, using the machine learning model, that the second expression is less favorable to the first class of applicants but more favorable to the second class of applicants when compared to the first expression; and
  responsive to determining the second expression, present the second expression on an interface device as a suggested replacement to the first expression in the job document.

* * * * *